(12) United States Patent
Hsieh et al.

(10) Patent No.: US 7,836,231 B2
(45) Date of Patent: Nov. 16, 2010

(54) BUFFER CONTROL METHOD AND DEVICE THEREOF

(75) Inventors: I-Lin Hsieh, Taipei (TW); Chun-Yuan Su, Taipei (TW)

(73) Assignee: Via Technologies, Inc., Hsien-Tien (TW)

( * ) Notice: Subject to any disclaimer, the term of this patent is extended or adjusted under 35 U.S.C. 154(b) by 370 days.

(21) Appl. No.: 11/798,279

(22) Filed: May 11, 2007

(65) Prior Publication Data

US 2008/0022021 A1    Jan. 24, 2008

(30) Foreign Application Priority Data

Jul. 21, 2006    (TW) ................................ 95126867 A

(51) Int. Cl.
G06F 3/00    (2006.01)
G06F 5/00    (2006.01)
G06F 12/00    (2006.01)

(52) U.S. Cl. ............................. 710/57; 710/56; 711/170

(58) Field of Classification Search ................... 710/52, 710/56, 57; 711/170
See application file for complete search history.

(56) References Cited

U.S. PATENT DOCUMENTS

| 5,361,372 | A  | * | 11/1994 | Rege et al. ................... 709/234 |
| 5,974,571 | A  | * | 10/1999 | Riesenman et al. ........... 714/47 |
| 6,697,968 | B1 | * | 2/2004  | Orfali .......................... 714/45 |
| 7,142,553 | B1 | * | 11/2006 | Ojard et al. .................. 370/421 |
| 2001/0034788 | A1 | * | 10/2001 | McTernan et al. ........... 709/232 |
| 2004/0042397 | A1 | * | 3/2004  | Chang et al. ................. 370/230 |

* cited by examiner

Primary Examiner—Niketa I Patel
Assistant Examiner—Farley J Abad
(74) Attorney, Agent, or Firm—Birch, Stewart, Kolasch & Birch, LLP

(57) ABSTRACT

A buffer control method for controlling packets to be stored in a buffer having a data region and a command queue region. First, the number of the packets that can be stored in the data buffer is determined. Then, a count value representing the remained capacity of the data region is updated. Finally, the count value and a value of maximum data length are compared to determine whether to increase the number of the packets that can be stored in the buffer.

15 Claims, 7 Drawing Sheets

BUFFER CONTROL METHOD AND DEVICE THEREOF

BACKGROUND OF THE INVENTION

1. Field of Invention

The invention relates to a buffer and, in particular, to a buffer control method and a device thereof.

2. Related Art

A buffer is widely used in the modern computer system for temporarily storing packets. A packet is mainly divided into a header and a data. The header contains a write command or a read response command of the following data. Usually, the length of the header is 4 bytes (1DW) or 8 bytes (1QW), and the length of the data is from 4 bytes (1DW) to 64 bytes (8QW).

FIG. 1 is a schematic illustration showing a buffer for storing packets. The buffer 120 includes a command queue region 121 and a data region 122. The command queue region 121 and the data region 122 are orderly arranged.

In FIG. 1, assume the total capacity of command queue region 121 is 4QW, and the command queue region 121 has four spaces #11~#14 (i.e. each space is 1QW) for respectively storing one command. Furthermore, the total capacity of data region 122 is 32QW, and the data region 122 has four spaces #21~#24 (i.e. each space is 8QW) for respectively storing one data. Each space #11~#14 of the command queue region 121 is corresponding to one of the spaces #21~#24 of the data region 122. For example, while four packets $PAK_1$~$PAK_4$ (i.e. each packet has 2QW data length) are stored in the buffer 120. Therefore, the commands of the packets $PAK_1$~$PAK_4$ are sequentially stored in the spaces #11~#14 of the command queue region 121 and the corresponding data of the packets $PAK_1$~$PAK_4$ are stored in the spaces #21~#24 of the data region 122.

As the description above, it's noticed that, each packet is stored in one space of the command queue region 121 and the data region 122. Therefore, each space #21~#24 of the data region has 6QW which is not used, resulting in the inefficiency usage of the buffer 120.

SUMMARY OF THE INVENTION

In view of the foregoing, the invention is to provide a buffer control method and a device thereof with enhanced packet storing efficiency in the buffer.

According to one embodiment of the present invention, a buffer control method for controlling one or more packets to be stored in a buffer is disclosed. The buffer has a data region and a command queue region. The total capacity of the buffer is estimated and the number of the packets that can be stored in the buffer is determined. A count value representing the remained capacity of the data region is updated while accessing the buffer, and the count value and a value of maximum data length is compared to determine whether to increase the number of the packets that can be stored in the buffer.

According to another embodiment of the present invention, a buffer control device disposed in an integrated circuit for controlling one or more packets to be stored in the integrated circuit is disclosed. The buffer control device includes a buffer connected to a bus for receiving one or more packets transmitted from the bus, wherein the buffer has a command queue region and a data region; and a controller connected to the buffer for estimating the total capacity of the buffer and determine the number of the packets can be stored in the buffer. The remained capacity of the data region is represented by a count value, and the controller updates the count value while the buffer is accessed.

According to the other embodiment of the present invention, a packet buffering method for buffering one or more packets to be stored in a buffer, which has a data region and a command queue region, is disclosed. The packet buffering method includes transmitting one of the packets to the buffer; updating a count value according to the access condition of the buffer, wherein the count value represents the remained capacity of the data region; and comparing the count value with a value of maximum data length to determine whether to transmit the next packet to the buffer.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
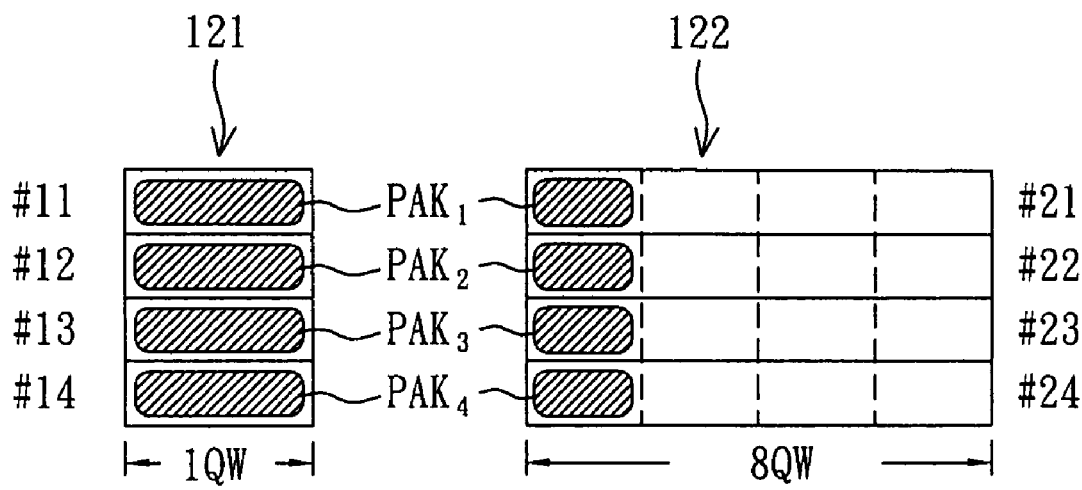
FIG. 1 is a schematic illustration showing a buffer in the conventional computer system.
Figure 2:
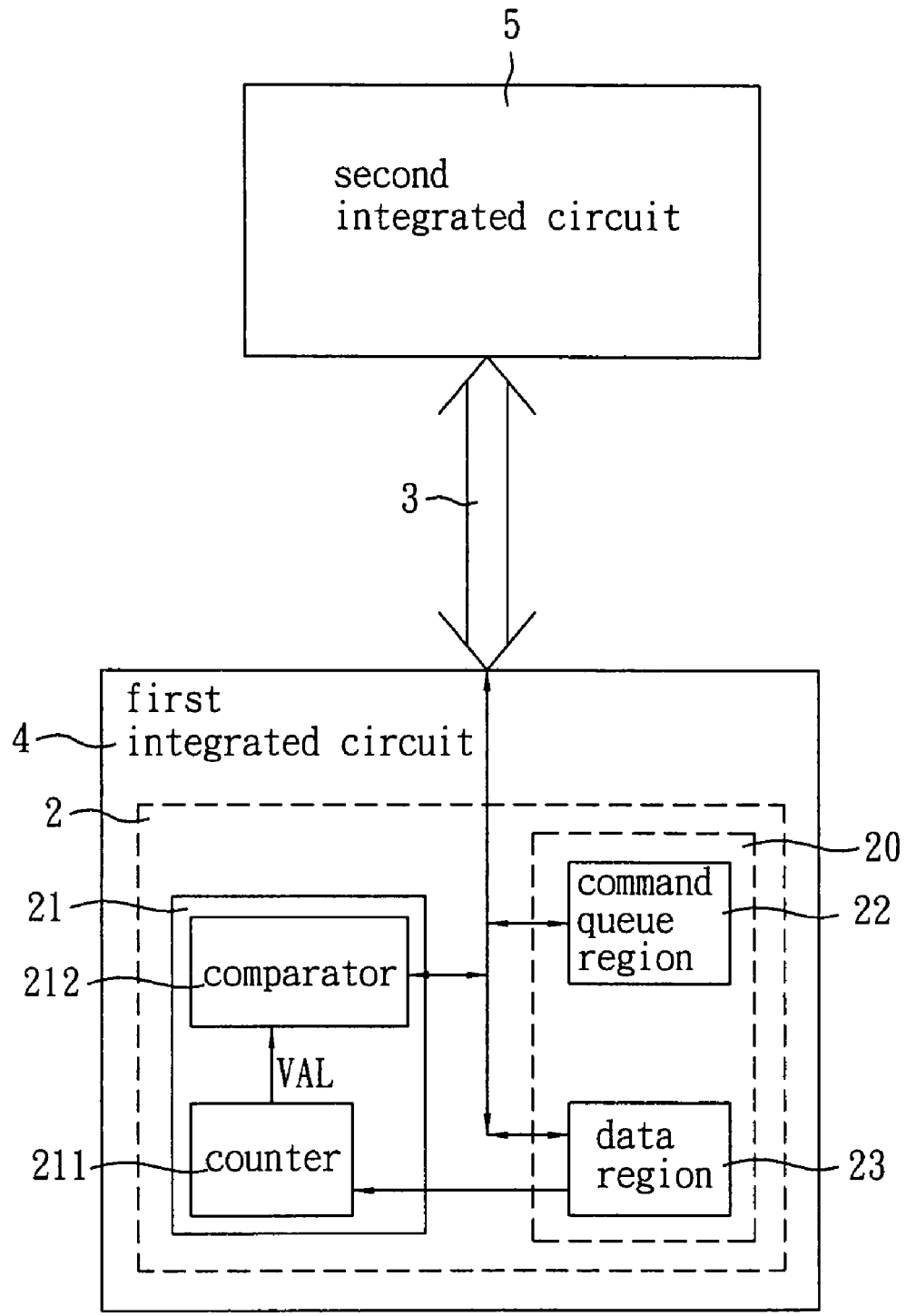
FIG. 2 is a block diagram showing a buffer control system according to a preferred embodiment of the invention.

FIG. 2 shows a computer system 400 according to the preferred embodiment of the invention. The computer system 400 includes a first integrated circuit 4 and a second integrated circuit 5. The first integrated circuit 4 and the second integrated circuit 5 are communicated via a bus 3. In the present invention, the first integrated circuit 4 has a buffer control device 2 for buffering the requests and data from the second integrated circuit 5. The buffer control device 2 includes a buffer 20 and a controller 21. The buffer 20 is separated into a command queue region 22 and a data region 23, and the controller 21 includes a counter 211 and a comparator 212. In the present invention, assume that a packet having a command (i.e. the command is indicated in the header of the corresponding packet) and data is transmitted to the first integrated circuit 4 through the bus 3, the packet would be stored in the buffer 20. More detail, the command of the packet is stored in the command queue region 22 and the corresponding data of the packet is stored in the data region 23. While the buffer 20 is accessed (i.e. either the packet is stored in the buffer 20 or the packet is removed from the buffer 20), the counter 211 updates a count value VAL. In the present invention, the count value VAL is regarded as the remained capacity of the data region 23. Then, the comparator 212 compares the count value VAL with a value of maximum data length Dmax (i.e. Dmax is the maximum data length supported by the bus 3) to determine whether the buffer has enough capacity for storing other packets.

Figure 3:
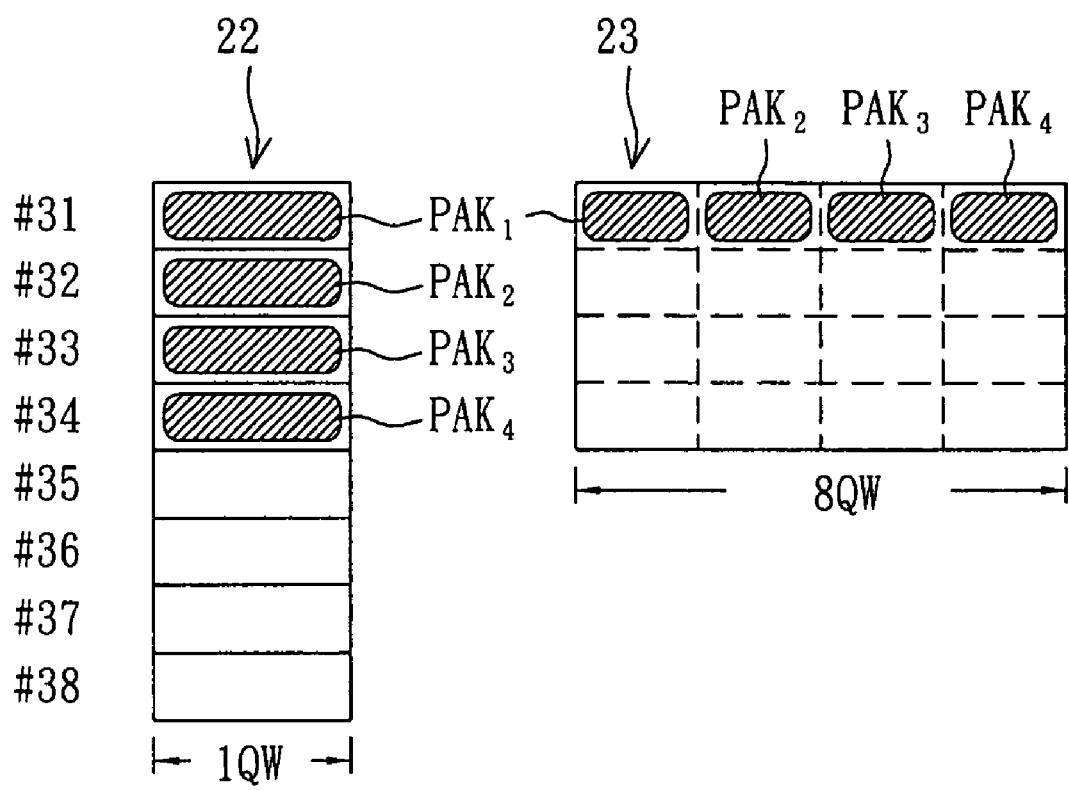
FIG. 3 is a schematic illustration showing a buffer according to the preferred embodiment of the invention.

In the present invention, as shown in FIG. 3, the data region 23 of the buffer 20 is existed without the column order. That is to say, the data of the packets are continuously and successively stored in the data region 23. Otherwise, in order to ensure the command queue region 22 has enough capacity for storing commands of the corresponding data in the data region 23, it's suggested that the capacity of the command queue region 22 is an integer greater than a quotient obtained by dividing the total capacity of the data region 23 by the value of maximum data length Dmax. For example, assume the total capacity of the data region 23 is 32QW and the value of maximum data length Dmax is 8QW, the capacity of the command queue region 22 is suggested to be greater than 4 (i.e. 32QW/8QW=4). In the present invention, as shown in FIG. 5, assume the command queue region 22 has eight spaces #31~#38 for respectively storing the commands of the corresponding data in the data region 23.

Figure 4:
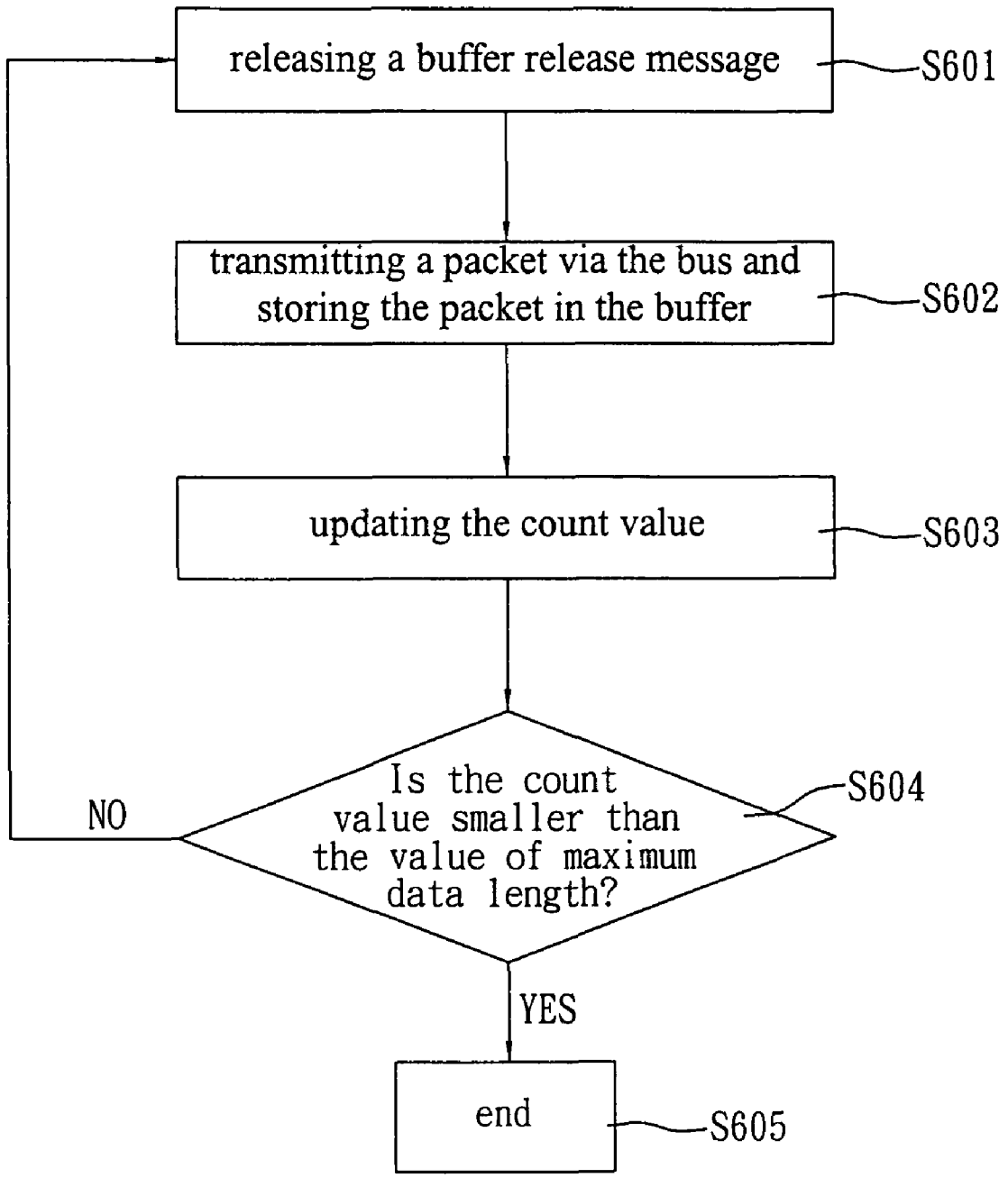
FIG. 4 is a flow chart showing a buffer control method according to a embodiment of the invention.

FIG. 4 is a flow chart showing a control method according to an embodiment of the invention. First, the buffer control device 2 releases a buffer release message to the bus 3 to allow a packet to be transmitted to the first integrated circuit 4 (step S601). The packet is transmitted via the bus 3 and stored in the buffer 20 (step S602). Then, the counter 211 updates the count value VAL (step S603). The comparator 212 then compares the count value VAL with the value of maximum data length Dmax to determine whether the count value VAL is smaller than the value of maximum data length Dmax (step S604). The step S604 is done for determining whether the remained capacity of the data region 23 is large enough for storing other packets. If the count value VAL is not smaller than the value of maximum data length Dmax, the procedure goes back to step S601 to release the buffer release message again to allow other packet to be transmitted. Otherwise, if the count value VAL is smaller than the value of maximum data length Dmax, the procedure is end (step S605).

Figure 5:
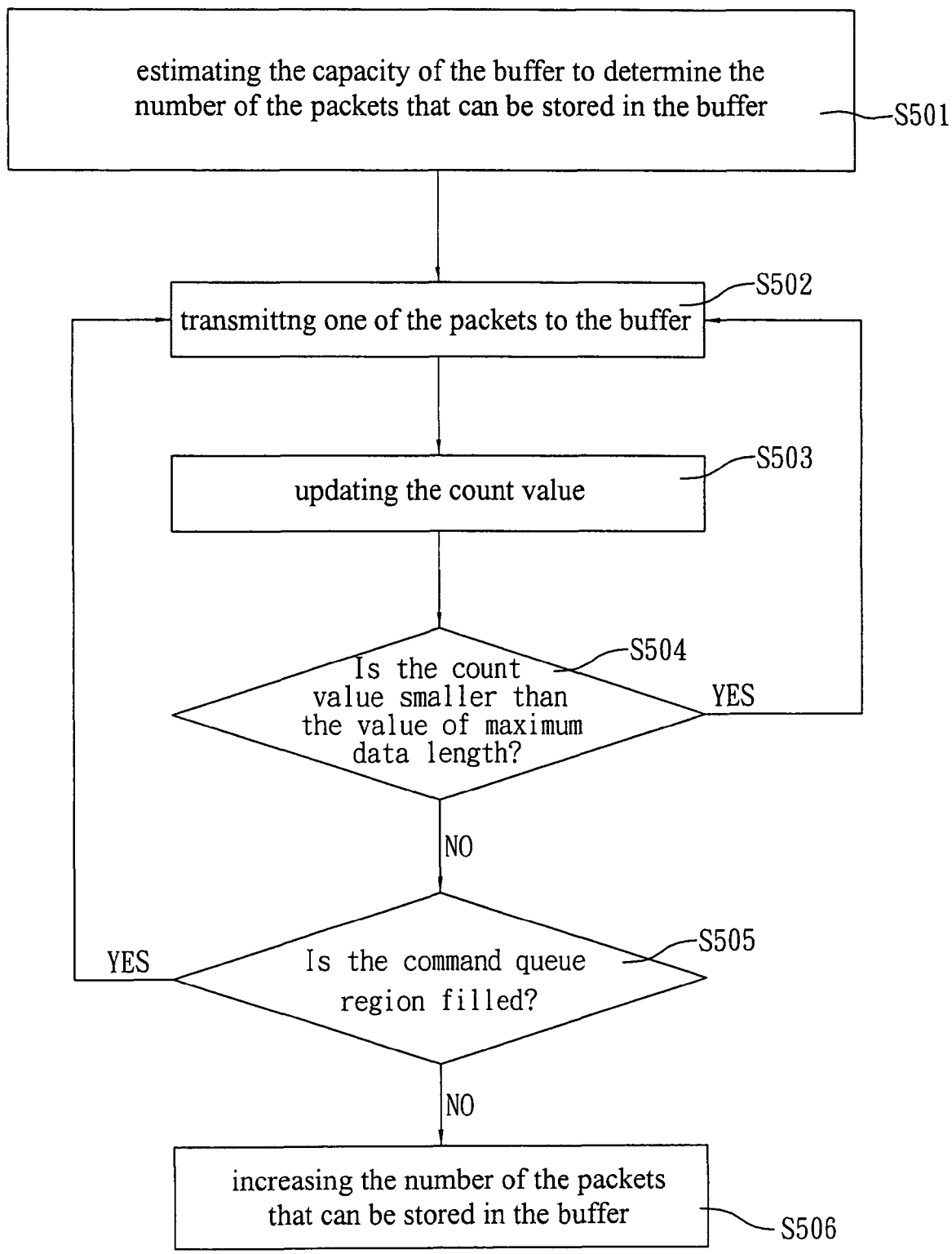
FIG. 5 is a flow chart showing a buffer control method according to another embodiment of the invention.
Figure 6:
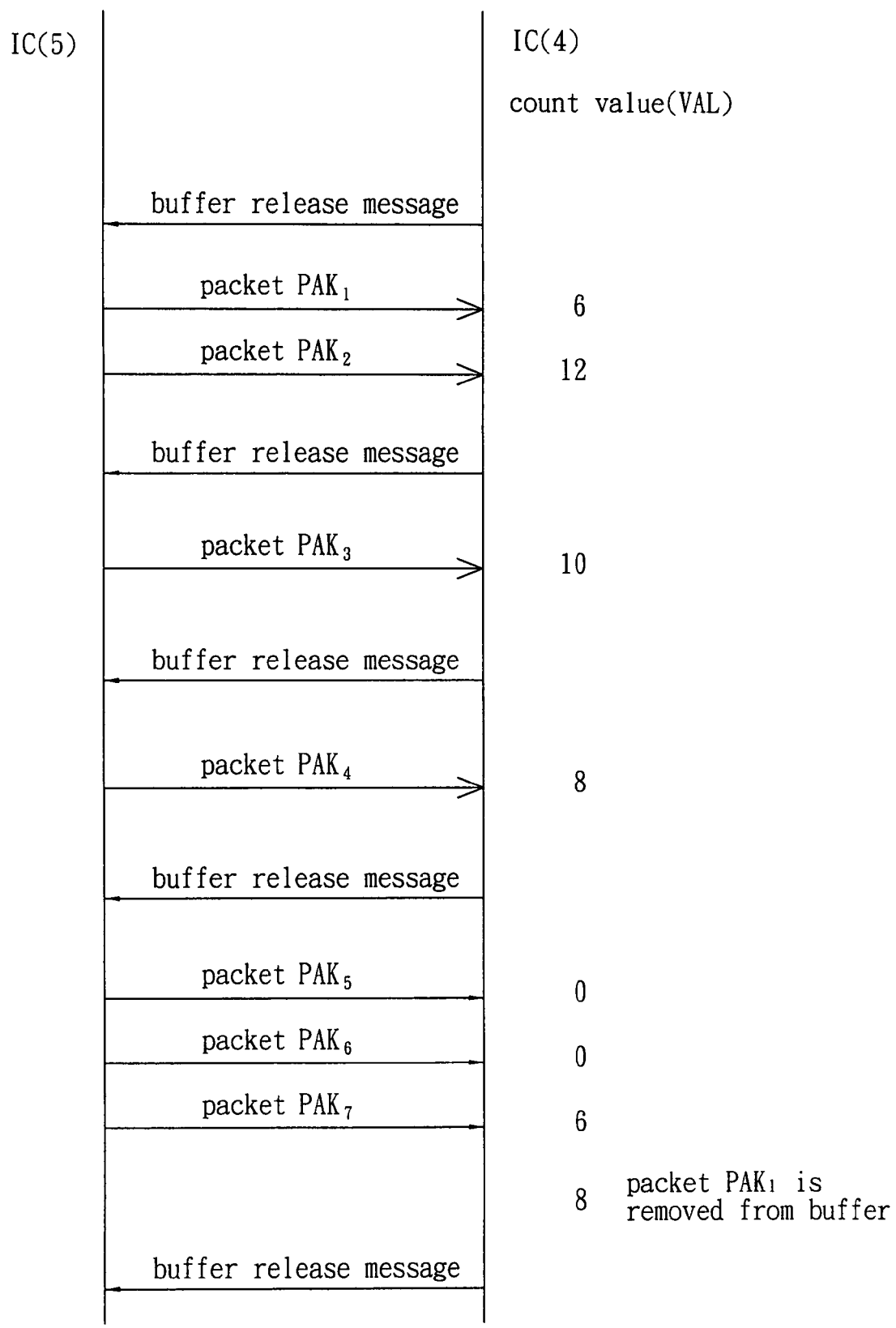
FIG. 6 is a schematic illustration of the buffer control method according to the invention.

FIG. 5 is a flow chart showing a control method according to another embodiment of the invention. First, the buffer control device 2 estimates the capacity of the buffer 20 to determine the number of the packets that can be stored in the buffer (step S501). In the present invention, assuming there are N packets $PAK_1$~$PAK_N$ could be stored in the buffer 20. Then, one packet $PAK_M$ of the packets $PAK_1$~$PAK_N$ is transmitted to the first integrated circuit 4 and the packet $PAK_M$ is stored in the buffer 20 (step S502). The counter 211 updates the count value VAL (step S503). The comparator 212 compares the count value VAL and the maximum data length Dmax to determine if the count value VAL is smaller than the value of maximum data length Dmax (step S504). The step S504 is done for determining whether the remained capacity of the data region 23 is large enough for storing the other packets. If the count value VAL is smaller than the value of maximum data length Dmax, the procedure jumps back to step S502 to continue transmitting the next packet $PAK_{M+1}$ to the first integrated circuit 4. If the count value VAL is not smaller than the value of maximum data length Dmax, determining whether the command queue region 22 is filled (step S505). If the command queue region 22 is filled, the procedure jumps back to step S502 to continue transmitting the next packet $PAK_{M+1}$ to the buffer 20. If the command queue region 22 is not filled, the number of the packets that can be stored in the buffer 20 is increased (step S506). That is, in such a situation, the buffer 20 can store packets $PAK_1$ to $PAK_{N+1}$.

As the above description, in the present invention, while the buffer 20 is accessed, the count value VAL is updated. For example, if a packet $PAK_1$ is stored in the buffer 20, the count value VAL is updated according to the value of maximum data length Dmax, the data length $DA_1$ of the stored packet $PAK_1$ and a setup value CNT. Furthermore, if the other packet $PAK_2$ is removed from the buffer 20, the count value VAL is updated according to the value of maximum data length Dmax, the data length $DA_2$ of the removed packet $PAK_2$ and the setup value CNT. Regarding to the setup value CNT, if the count value VAL is smaller than the value of maximum data length Dmax, the value CNT is substantially equal to the count value VAL that is previously updated; otherwise, if the count value VAL is not smaller than the value of maximum data length Dmax, the setup value CNT is substantially equal to the count value VAL that is previously updated minus the value of maximum data length. While the packet $PAK_1$ is stored in the buffer 20 and no packet is removed from the buffer 20, the count value VAL is substantially equal to (Dmax–$DA_1$+CNT). Furthermore, while the packet $PAK_2$ is removed from the buffer 20, the count value VAL is substantially equal to (CNT+$DA_2$).

For example, it is assumed that the command queue region 22 has 8 spaces #31~#38 for storing the commands of packets, the total capacity of the data region 23 is 32QW and the value of maximum data length Dmax is 8QW.

If the buffer 20 is empty at initial, the buffer control device 2 determines that there are four packets $PAK_1$ to $PAK_4$ (i.e. 32QW/8QW=4) can be stored in the buffer 20. Therefore the buffer control device 2 releases a buffer release message to inform that four packets could be sequentially transmitted to the first integrated circuit 4.

Assume the data length $DA_1$ of the first packet $PAK_1$ is 2QW, while the first packet $PAK_1$ is received and stored in the buffer 20, the count value VAL is updated substantially to be 6QW (i.e. VAL=Dmax (=8QW)–$DA_1$ (=2QW)+CNT (=0QW)). Due to the count value VAL (=6QW) is smaller than the value of maximum data length Dmax (=8QW), the number of packets that can stored in the buffer 20 is remained (i.e. still 4 packets).

Then, the second packet $PAK_2$ is transmitted to the first integrated circuit 4. Assume the data length $DA_2$ of the second packet $PAK_2$ is 2QW, while the second packet $PAK_2$ is received and stored in the buffer 20, the count value VAL is updated substantially to be 12QW (i.e. VAL=Dmax (=8QW)–$DA_2$ (=2QW)+CNT (=6QW)). Due to the count value VAL (=12QW) is not smaller than the value of maximum data length Dmax (=8QW), and the command queue region 22 is not filled. Therefore, the buffer control device 2 releases a buffer release message to inform that the buffer 20 could store one more packet $PAK_5$ (i.e. the number of packets can be stored in the buffer 20 is increased to be 5 packets). Then, the setup value CNT is substantially to be 4QW (i.e. CNT=VAL(=12QW)–Dmax (=8QW)).

Next, the third packet $PAK_3$ is transmitted to the first integrated circuit 4. Assume the data length $DA_3$ of the third packet $PAK_3$ is 2QW, while the third packet $PAK_3$ is received and stored in the buffer 20, the count value VAL is updated substantially to be 10QW (i.e. VAL=Dmax (=8QW)–$DA_3$ (=2QW)+CNT (=4QW)). Due to the count value VAL (=10QW) is not smaller than the value of maximum data length Dmax (=8QW), and the command queue region 22 is not filled, the buffer control device 2 releases a buffer release message to inform that the buffer 20 can store one more packet $PAK_6$ (i.e. the number of packets can be stored in the buffer 20 is increased to be 6 packets). Then, the setup value CNT is substantially to be 2QW (i.e. CNT=VAL(=10QW)–Dmax (=8QW)).

Next, the fourth packet $PAK_4$ is transmitted to the first integrated circuit 4. Assume the data length $DA_4$ of the fourth packet $PAK_4$ is 2QW, while the fourth packet $PAK_4$ is received and stored in the buffer 20, the count value VAL is updated substantially equal to be 8QW (i.e. VAL=Dmax (=8QW)−$DA_4$ (=2QW)+CNT (=2QW)). Due to the count value VAL (=8QW) is not smaller than the value of maximum data length Dmax (=8QW) and the command queue region 22 is not filled, the buffer control device 2 releases a buffer release message to inform that the buffer 20 could store one more packet $PAK_7$ (i.e. the number of packets can be stored in the buffer 20 is increased to be 7 packets). Then, the setup value CNT is substantially to be 0QW (i.e. CNT=VAL (=8QW)−Dmax(=8QW)).

Next, the fifth packet $PAK_5$ is transmitted to the first integrated circuit 4. Assume the data length $DA_5$ of the fifth packet $PAK_5$ is 8QW; therefore, while the fifth packet $PAK_5$ is received and stored in the buffer 20, the count value VAL is updated substantially to be 0QW (i.e. VAL=Dmax (=8QW)−$DA_5$ (=8QW)+CNT (=0QW)). Due to the count value VAL (=0QW) is smaller than Dmax (=8QW), the number of packets that can stored in the buffer 20 is remained (i.e. 7 packets).

Next, the sixth packet $PAK_6$ is transmitted to the first integrated circuit 4. Assume the data length $DA_6$ of the sixth packet $PAK_6$ is 8QW, while the sixth packet $PAK_6$ is received and stored in the buffer 20, the count value VAL is updated substantially to be 0QW (i.e. VAL=Dmax (=8QW)−$DA_6$ (=8QW)+CNT(=0QW)). Due to the count value VAL (=0QW) is smaller than Dmax (=8QW), the number of packets that can stored in the buffer 20 is remained (i.e. 7 packets).

Next, the seventh packet $PAK_7$ is transmitted to the first integrated circuit 4. Assume the data length $DA_7$ of the seventh packet $PAK_7$ is 2QW, while the sixth packet $PAK_6$ is received and stored in the buffer 20, the count value VAL is updated substantially equal to be 6QW (i.e. VAL=Dmax (=8QW)−$DA_7$ (=2QW)+CNT(=0QW)).

Figure 7:
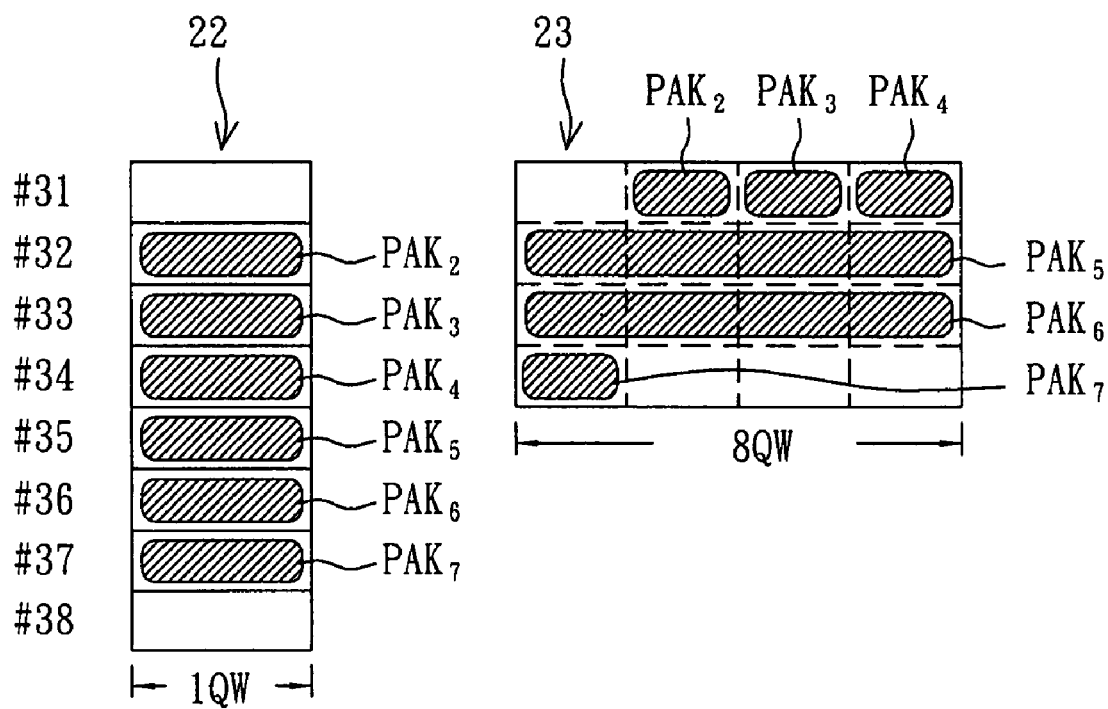
FIG. 7 is a schematic illustration showing a buffer according to the invention.

Next, assume the first packet $PAK_1$ is removed from the buffer 20, the count value VAL is updated substantially to be 8QW (i.e. VAL=CNT (=6QW)+$DA_1$ (=2QW)). Due to the count value VAL (=8QW) is not smaller the value of maximum data length Dmax (8QW), and the command queue region 22 is not filled, the buffer control device 2 releases a buffer release message. The following method for controlling packets to be stored in the buffer 20 is the same as that mention above and no longer to be described here. Detailed conditions of the packets stored in the buffer 20 are illustrated in FIG. 7.

In the present invention, the bus 3 could be implemented as the HT bus with the value of maximum data length of 64 bytes. The first integrated circuit 4 and the second integrated circuit 5 may be respectively implemented as a chipset and a CPU of a computer system.

In summary, according to the buffer control method and device thereof of the present invention, the buffer can be efficiently used with respect to the capacity of the buffer.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A buffer control method for controlling one or more packets to be stored in a buffer, wherein the buffer has a data region and a command queue region, the method comprising:

estimating the total capacity of the buffer and determining the number of the packets that can be stored in the buffer;

updating a count value while accessing the buffer, wherein the count value represents the remained capacity of the data region; and comparing the count value with a value of maximum data length supported by a bus to determine whether to increase the number of the packets that can be stored in the buffer, wherein while storing a first packet in the buffer, the count value is updated as equal to the value of maximum data length minus the data length of the first packet and plus a setup value, and while removing a second packet from the buffer, the count value is updated as equal to the setup value plus the data length of the second packet.

2. The method according to claim 1, further comprising releasing a buffer release message to transmit the packets to the buffer.

3. The method according to claim 1, wherein the number of the packets that can be stored in the buffer is estimated according to the remained capacity of the data region, the capacity of the command queue region and the value of maximum data length.

4. The method according to claim 3, further comprising increasing the number of the packets that can be stored in the buffer while the count value is not smaller than the value of maximum data length and the command queue region is not filled.

5. The method according to claim 4, wherein the setup value is equal to the count value that was previously updated minus the value of maximum data length.

6. The method according to claim 3, wherein the number of the packets that can be stored in the buffer is not increased while either the count value is smaller than the value of maximum data length or the command queue region is filled.

7. The method according to claim 6, wherein the setup value is equal to the count value that was previously updated.

8. The method according to claim 3, wherein the capacity of the command queue region is greater than a quotient obtained from dividing the capacity of the data buffer by the value of maximum data length.

9. A buffer control device disposed in an integrated circuit for controlling one or more packets to be stored in the integrated circuit, the buffer control device comprising:

a buffer connected to a bus for receiving the packets transmitted from the bus, wherein the buffer has a command queue region and a data region; and a controller connected to the buffer for estimating the total capacity of the buffer and determining the number of the packets that can be stored in the buffer, wherein the remained capacity of the data region is represented by a count value, and the controller updates the count value while the buffer is accessed, wherein the controller comprises:

a counter connected to the buffer for estimating the total capacity of the buffer and updating the count value; and a comparator connected to the counter for comparing the count value with the value of maximum data length supported by the bus to determine whether to increase the number of the packets that can be stored in the buffer, wherein while a first packet is stored in the buffer, the count value is updated as equal to the value of maximum data length minus the data length of the first packet and plus a setup value, and while a second packet is removed from the buffer, the count value is updated as equal to the setup value plus the data length of the second packet.

10. The device according to claim 9, wherein the controller determines the number of the packets that can be stored in the buffer according to the remained capacity of the data region, the capacity the command queue region and a value of maximum data length.

11. The device according to claim 10, wherein while the count value is not smaller than the value of maximum data length and the capacity of the command queue region is not filled, the controller increases the number of the packets that can be stored in the buffer.

12. The device according to claim 11, wherein the setup value is equal to the count value that was previously updated minus the value of maximum data length.

13. The device according to claim 10, wherein while either the count value is smaller than the value of maximum data length or the command queue region is filled, the controller doesn't increases the number of the packets that can be stored in the buffer.

14. The device according to claim 13, wherein the setup value is equal to the count value that was previously updated.

15. The device according to claim 10, wherein the capacity of the command queue region is greater than a quotient obtained from dividing the capacity of the data buffer by the value of maximum data length.

* * * * *